United States Patent [19]

Tsuneda et al.

[11] Patent Number: 4,677,356
[45] Date of Patent: Jun. 30, 1987

[54] DC MOTOR DRIVE CONTROL DEVICE

[76] Inventors: Haruhiro Tsuneda, No. 489, Inabe; Yasuzumi Yoshimura, No. 6100, Uenohara, both of Ina-shi, Nagano, Japan

[21] Appl. No.: 809,812

[22] Filed: Dec. 17, 1985

[30] Foreign Application Priority Data

Dec. 27, 1984 [JP] Japan .................... 59-279780

[51] Int. Cl.$^4$ ............................................. H02P 7/06
[52] U.S. Cl. ..................... 318/258; 318/254; 318/293; 318/294; 318/432
[58] Field of Search ............... 318/138, 254, 255, 256, 318/257, 258, 259, 260, 268, 269, 270, 280, 289, 293, 294, 439, 599, 811, 432; 361/23, 31; 363/98

[56] References Cited

U.S. PATENT DOCUMENTS 4,368,411  1/1983  Kidd ........................ 318/599 X
4,525,657  6/1985  Nakase et al. ............... 318/254
4,528,486  7/1985  Flaig et al. ................ 318/254

Primary Examiner—William M. Shoop, Jr.
Assistant Examiner—Bentsu Ro
Attorney, Agent, or Firm—Sughrue, Mion, Zinn, Macpeak & Seas

[57] ABSTRACT

A DC motor is connected across the mid-points of a bridge circuit which includes a switching device in each leg of the bridge. A forward or reverse motor direction drive current flows through the motor depending on the conducting states of the switching devices. A motor drive control device operates to produce either forward or reverse drive signals for controlling the conductivities of the bridge switching devices to thereby produce a forward or reverse motor direction drive current in response to a forward or reverse drive signal respectively. The drive control device detects and measures the level of the motor drive current and when it exceeds a predetermined target value, orders a gating circuit in the path of the forward and reverse drive signals, to invert the forward and reverse drive signals to thereby reverse the direction of the motor direction drive current. This produces a braking action. The gating circuit is preferably constructed of a plurality of EXCLUSIVE OR circuits.

9 Claims, 7 Drawing Figures

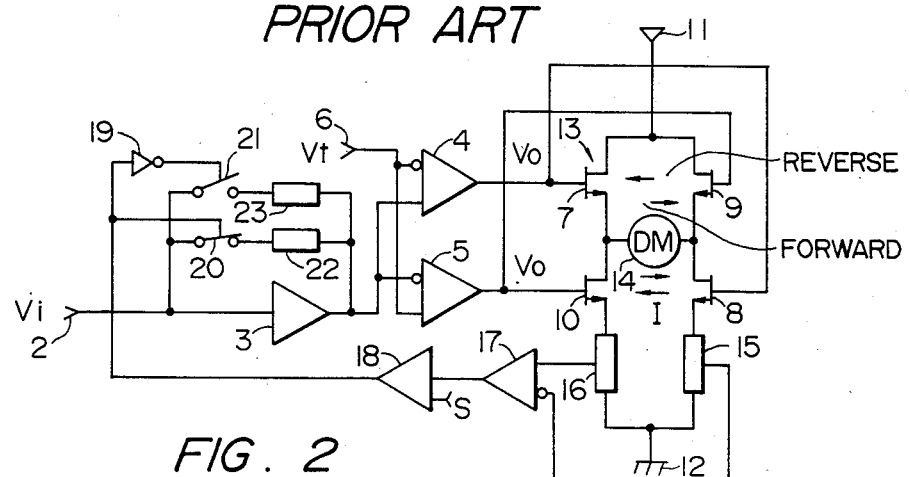
FIG. 1
PRIOR ART
FIG. 2
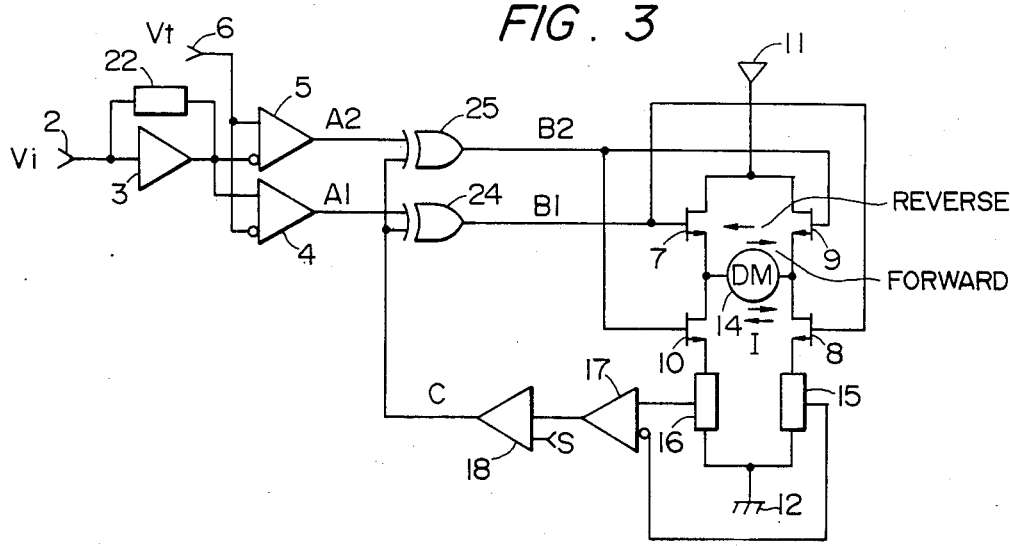
FIG. 3

DC MOTOR DRIVE CONTROL DEVICE

BACKGROUND OF THE INVENTION

1. Field of the Invention

This invention relates to a motor drive control technique, and more particularly, to a circuit for controlling the drive current of the motor such that it does not exceed a predetermined target value.

2. The Prior Art

FIG. 1 shows a conventional drive control device to which this invention relates.

An input terminal 2 for receiving a current instruction signal, $V_i$, is connected through a current amplifier 3 to first input terminals of two PWM (pulse width modulation) type comparators 4 and 5, the other input terminals of which are connected to an input terminal 6 for receiving a triangular wave signal $V_t$. The output terminals of the comparators 4 and 5 are connected to the control input terminals of switching elements 7, 8, 9 and 10 such as FETs. These switching elements 7, 8, 9 and 10 form a bridge circuit 13 functioning as a reversible chopper for selectively suppling current from a power source terminal 11 through a DC motor 14 in either the forward or reverse direction to ground 2.

The DC motor 14 to be controlled is connected between the mid-points of the bridge circuit 13, that is, between the node connecting switching elements 7 and 10, and the node connecting switching elements 8 and 9. The bridge circuit 13 includes current detectors 15 and 16, such as current transformers, connected, respectively, between ground and switching element 8, and ground and switching element 10. The current detectors 15 and 16 are also connected to a current detecting amplifier 17, the output of which is connected to an absolute value comparator 18. The output terminal of the absolute value comparator 18 is connected directly to a switch circuit 20 and, through an inverter circuit 19, to a switch circuit 21. First terminals of the switch circuits 20 and 21 are connected to the input terminal of the current amplifiter 3, and the other terminals are connected, respectively, through time-constant adjusting devices 22 and 23 to the output terminal of the current amplifier 3.

The current instruction signal $V_i$ is applied to the current amplifier 3. The output of the current amplifier 3 is applied directly to a first input terminal of the comparator 4, and is also applied to a first input terminal of the comparator 5 through an inverter. That is, each of the comparators 4 and 5 receives the current instruction signal $V_i$ through its first input terminal and the triangular wave signal $V_t$ through its second input terminal. The comparators subject these signals to a comparison to provide a drive signal $V_O$ having a pulse width proportional to the current instruction signal $V_i$. The output drive signal $V_O$ of the comparator 4 is applied to the control input terminals of the switching elements 7 and 8, and the output drive signal $V_O$ of the comparator 5 is applied to the control input terminals of the switching elements 9 and 10. Therefore, either the switching elements 7 and 8, or 9 and 10 of the bridge circuit 13 are simultaneously conducting to drive the DC motor 14 at a predetermined speed by controlling the value and direction of the drive current I passing through the DC motor 14.

The drive current I is detected by the current detectors 15 and 16, amplified by the amplifier 17, and compared with a reference value S. When the drive current I becomes excessively large as determined by the reference value S, the absolute value comparator 18 turns on the switch circuit 21 while turning switch circuit 20 off to thereby change the time constant and gain of current amplifier 3. As shown in FIG. 2, when the switch circuit 20 is turned on, the drive circuit transfer function is $A \cdot Gm/(1 + A \cdot Gm \cdot Gfb)$, and when the switch circuit 21 is turned on, the transfer function is $X \cdot A \cdot Gm/(1 + X \cdot A \cdot Gm \cdot Gfb)$.

In this way, the gain and the time constant of the current amplifier 3 are multiplied by a factor X (where X is larger than 0 and smaller than 1). As a result, the current amplifier 3 operates to decrease the drive current I. Thus, owing to the gain and time constant of the current amplifier 3 and the hysteresis characteristic of the absolute value comparator 13, the drive control device of FIG. 1 causes the drive current I to repeatedly oscillate about the target value in a step-wise fashion.

In the conventional drive control device, the switch circuits 20 and 21 and the time constant adjusting devices 22 and 23 are externally connected to the current amplifier 3. Therefore, the conventional drive control device is intricate, and difficult to adjust to an ideal setting. Furthermore, as it is essential that the circuit time constants are large, the device response speed is low. In addition, the peak current is high, which makes it difficult to control the current with high accuracy. Still further, the device, being affected by noise, may become unstable.

SUMMARY OF THE INVENTION

An object of this invention is to provide a drive control device and particularly a drive control device with the current amplifier 3, which will not fail, which has fewer components than the conventional drive control device, and which is simple to adjust.

In the motor drive control device of the invention, the current amplififer 3 is not provided with the switch circuits 20 and 21, and the adjusting devices 22 and 23. Instead EXCLUSIVE OR circuits are provided on the output side of the PWM type comparators 4 and 5, and the output terminal of the absolute value comparator 18 is connected to first input terminals of the EXCLUSIVE OR circuits. The EXCLUSIVE OR circuits invert the outputs of the comparators 4 and 5 according to the output signal level of the absolute value comparator 18. Therefore, when the drive current exceeds the target value, the drive current I is decreased as if the motor were braked, so that the drive current I is maintained at a value no greater than the target value.

BRIEF DESCRIPTION OF THE DRAWINGS

FIG. 1 is a circuit diagram showing a conventional drive control device.

FIG. 2 is a block diagram illustrating the transfer functions established by the device of FIG. 1.

FIG. 3 is a circuit diagram showing a drive control device according to this invention.

DETAILED DESCRIPTION OF THE PREFERRED EMBODIMENT

Figure 4:
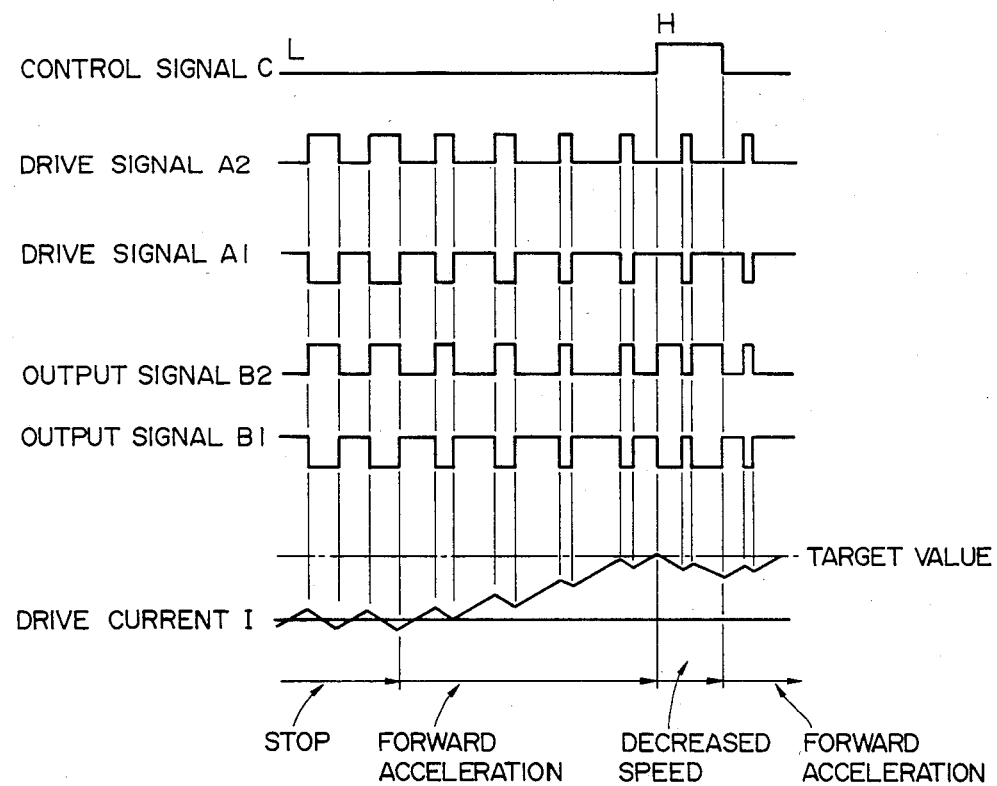
FIG. 4 is a time chart illustrating the operation of the device according to the invention illustrated in FIG. 2.

Embodiments of this invention will now be described in detail with reference to the accompanying drawings.

FIG. 3 shows a drive control device according to the invention. In FIG. 3, those components which have been previously described with reference to FIG. 1 are designated by the same reference numerals or characters.

As is apparent from FIG. 3, the drive control device of the invention is not provided with the switch circuits 20 and 21 and the adjusting device 23. The output terminals of the PWM comparators 4 and 5 are connected to first input terminals of EXCLUSIVE OR circuits 24 and 25, respectively, second input terminals of which are connected to the output terminal of the absolute value amplifier 18. The output terminal of the EXCLUSIVE OR circuit 24 is connected to the control input terminals of the switching elements 7 and 8. Similarly, the output terminal of the EXCLUSIVE OR circuit 25 is connected to the control input terminals of the switching elements 9 and 10. The current amplifier 3, and the comparators 4 and 5 form a drive signal generating section.

The operation of the drive control device illustrated in FIG. 3 will now be described. FIG. 4 shows the output signals A1 and A2 of the comparators 4 and 5, the output signals B1 and B2 of the EXCLUSIVE OR circuits 24 and 25, and the control signal C of the absolute value comparator 18 produced by the drive control device of the invention. In FIG. 4, the left-most portions of the illustrated waveforms occur when the DC motor 14 is stopped. At that time, the duty ratio of each of the drive signals A1 and A2 is 50%. When the DC motor 14 is accelerated, for instance, in the forward direction, the duty ratio of the drive signal A1 approaches 100%, while the duty ratio of the drive signal A2 approaches 0%. In response to the duty ratio variation and after a small time delay, the drive current I gradually increases.

When the drive current I exceeds the target value, the level of the control signal C of the absolute value comparator 18 is raised to the "H" level from the "L" level. As a result, the output signals B1 and B2 of the EXCLUSIVE OR circuits 24 and 25 are inverted as shown in FIG. 4 and, therefore, the drive current I of the DC motor 14 flows in the reverse direction, the duty ratios being the same as when the drive control device was in the forward acceleration mode. Thus, the speed of the DC motor 14 is decreased due to the braking action which results from the reverse direction of the drive current flow. When the drive current I is decreased to the target value due to the braking action, the level of the control signal C is changed to the "L" level from the "H" level, and the levels of the output signals B1 and B2 are restored to their previous levels which produce a forward drive to the motor. Thus, owing to the hysteresis characteristic of the absolute value comparator 18, the drive current I of the DC motor 14 oscillates about the target value.

Figure 5:
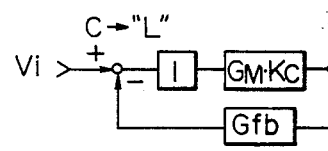
FIGS. 5 and 6 are block diagrams illustrating the transfer functions established by the drive control device of the invention.
Figure 6:
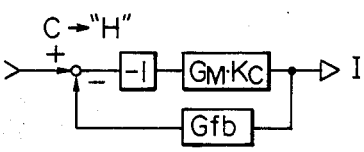

FIGS. 5 and 6 show control systems in the above-described control modes, respectively. When the control signal C is at the "L" level, the transfer function is GM·Kc/(1+GM·Gfb), and the time constant is GM·Gfb. When the control signal C is at the "H" level, the transfer function is—GM·Kc/(1−GM·Gfb), and the time constant is GM·Gfb.

That is, when the current control system is operated to switch the drive signal A1 and A2 from their forward drive mode to their reverse drive mode, the gain of the control system is set at a value which is about −1 times that which is provided at the time just prior to the switching instruction. The drive current I is controlled with the time constant which is determined from the time constant GM Gfb and the hysteresis characteristic of the absolute value comparator 18.

Figure 7:
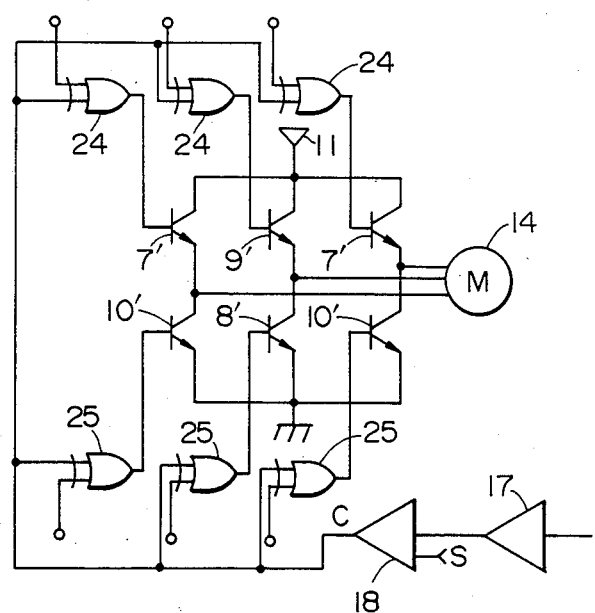
FIG. 7 is a circuit diagram showing another embodiment of the invention.

In the above-described embodiment, a DC motor 14 is controlled by the drive control device of the invention. However, the drive control device can also be employed as a control circuit for a three phase brushless motor as shown in FIG. 7. In this application, the EXCLUSIVE OR circuits (24 and 25) are provided respectively for switching means such as transistors 7', 8', 9' and 10', and the output terminal of the absolute value comparator 18 is connected to first input terminals of the EXCLUSIVE OR circuits 24 and 25. Therefore, the bridge circuit of the claimed invention includes switching transistors connected as a switching circuit for a three phase motor as shown in FIG. 7.

The embodiment of the invention shown in FIG. 3 employs FETs, which have excellent rise time characteristics, in order to provide high-speed switching characteristics. However, the switching elements 7, 8, 9 and 10 may be replaced by switching transistors as shown in FIG. 7, or other semiconductor switches. Furthermore, the absolute value comparator 18 may be replaced by an ordinary comparator which regulates only the upper or lower limit of the acceptable range.

The herein described invention provides the following special advantages:

The elapsed time from the time instant that the motor drive current exceeds the target value until it is decreased to the target value is very short. Therefore, the current overshooting or undershooting range can be made small, and the current overshooting period can also be made short. Therefore, current control can be achieved with high accuracy.

In the invention, only the EXCLUSIVE OR circuits and a single time constant circuit 22 are required as circuit elements in place of plural switching circuits 20, 21 and plural time constant circuits 22, 23. Therefore, the number of components is small, and the adjustment can be readily achieved.

What is claimed is:

1. A motor drive control device for controlling drive current for a motor, comprising:
   a bridge circuit means formed with switching elements, said motor being connected to said bridge circuit means such that forward or reverse drive circuit can be selectively made to flow through said motor depending on the conducting state of said switching elements;
   a current detecting means for detecting the drive current through said motor;
   a comparing means for comparing an output of said current detecting means with a predetermined value and for generating an output indicating whether or not the drive current is greater than said predetermined value;
   a drive signal generating means for controlling the conductivities of said switching elements; and
   EXCLUSIVE OR circuits, provided between said drive signal generating means and said switching elements, for receiving the output of said comparing means and the outputs of said drive signal generating means, the outputs of said EXCLUSIVE OR circuits being applied to said switching elements.

2. A motor drive control device as claimed in claim 1, further comprising a current detecting amplifier, coupled between said current detecting means and said comparing means, for amplifying the output of said current detecting means.

3. A motor drive control device as claimed in claim 2, wherein said comparing means is an absolute value comparator.

4. A motor drive control device as claimed in claim 1, wherein said switching elements are FETs.

5. A motor drive control device as claimed in claim 1, wherein said bridge circuit is a three-phase switching circuit.

6. A motor drive control device as claimed in claim 5, wherein said motor is a three-phase brushless motor.

7. A motor drive control device as claimed in claim 1, wherein said motor is a DC motor.

8. A motor drive control device as claimed in claim 7, wherein said drive signal generating means includes an amplifier circuit with a time constant circuit in its feedback path, first and second comparators each having a non-inverting input and an inverting input, the output of said amplifier circuit being connected to the non-inverting input of said first comparator and to the inverting input of said second comparator, the inverting input to said first comparator and the non-inverting input to said second comparator being adapted for connection to an input signal, said EXCLUSIVE OR circuits comprising first and second EXCLUSIVE OR circuits, the output of the first comparator being connected to one input of the first EXCLUSIVE OR circuit, its second input receiving said ouptut of said comparing means, the output of the second comparator being connected to one input of the second EXCLUSIVE OR circuit, its second input receiving said output of said comparing means.

9. A motor drive control device for controlling motor drive current, comprising:
a bridge circuit comprising switching elements in the legs of the bridge circuit, the motor being connected across the bridge circuit such that forward or reverse motor drive current flows through the motor depending on the conducting state of the switching elements;
means for producing forward and reverse drive signals for controlling the conductivities of said switching elements, said motor receiving forward motor drive current in response to forward drive signals to said switching elements and reverse motor drive current in response to reverse drive signals to said switching elements;
means for detecting the level of the motor drive current;
means for comparing the level of the detected motor drive current with a predetermined target value current to determine when the motor drive current exceeds a predetermined target value; and
gating circuit means, connected between said drive signal producing means and said switching elements and responsive to said comparing means for inverting the drive signals before they are applied to said switching means when said comparing means determines that the level of the detected motor drive current has increased beyond said target value to thereby decrease the level of the motor drive current below said target value.

* * * * *

UNITED STATES PATENT AND TRADEMARK OFFICE
CERTIFICATE OF CORRECTION

PATENT NO. : 4,677,356

DATED : June 30, 1987

INVENTOR(S) : Haruhiro TSUNEDA et al

It is certified that error appears in the above-identified patent and that said Letters Patent is hereby corrected as shown below:

On the title page insert:

-- [73] Assignees: Kabushiki Kaisha Sankyo Seiki Seisakusho Nagano, Japan --.

Signed and Sealed this

Twenty-seventh Day of October, 1987

Attest:

DONALD J. QUIGG

Attesting Officer

Commissioner of Patents and Trademarks